(12) United States Patent
Minamisawa et al.

(10) Patent No.: US 12,474,539 B2
(45) Date of Patent: Nov. 18, 2025

(54) OPTICAL UNIT

(71) Applicant: NIDEC SANKYO CORPORATION, Nagano (JP)

(72) Inventors: Shinji Minamisawa, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 943 days.

(21) Appl. No.: 17/581,960

(22) Filed: Jan. 23, 2022

(65) Prior Publication Data

US 2022/0252822 A1    Aug. 11, 2022

(30) Foreign Application Priority Data

Feb. 9, 2021 (JP) .................................. 2021-018842
Apr. 12, 2021 (JP) .................................. 2021-067130

(51) Int. Cl.
*G02B 7/02*    (2021.01)

(52) U.S. Cl.
CPC ...................................... *G02B 7/02* (2013.01)

(58) Field of Classification Search
CPC ................................ G02B 7/02; G02B 27/646
USPC ......................................................... 359/822
See application file for complete search history.

(56) References Cited

U.S. PATENT DOCUMENTS

| | | | |
|---|---|---|---|
| 2018/0284567 A1* | 10/2018 | Minamisawa | G03B 5/00 |
| 2021/0124143 A1* | 4/2021 | Wu | G02B 27/646 |
| 2021/0132407 A1* | 5/2021 | Minamisawa | G02B 7/02 |
| 2021/0223661 A1* | 7/2021 | Minamisawa | G02B 27/646 |
| 2022/0070347 A1* | 3/2022 | Han | H04N 23/45 |
| 2022/0146782 A1* | 5/2022 | Ni | G02B 27/646 |

FOREIGN PATENT DOCUMENTS

JP    2020027134    2/2020

* cited by examiner

*Primary Examiner* — Stephone B Allen
*Assistant Examiner* — Boutsikaris Leonidas
(74) *Attorney, Agent, or Firm* — JCIPRNET

(57) ABSTRACT

An optical unit comprises a movable body, a fixed body, a rotation support mechanism, and a gimbal mechanism, in which the movable body has a first side surface, a second side surface, a third side surface, and a fourth side surface as movable-body side surfaces, the first side surface positioning on an opposite side to the third side surface, and the second side surface positioning on an opposite side to the fourth side surface, a flexible printed circuit board is connected to the movable body on the first side surface side, has clearances provided with respect to the movable-body side surface, and has side-surface facing regions facing the movable-body side surface, and the side-surface facing regions are arranged to face the first side surface and the second side surface but not to face the third side surface and the fourth side surface.

15 Claims, 10 Drawing Sheets

OPTICAL UNIT

CROSS REFERENCE TO RELATED APPLICATION

The present invention claims priority under 35 U.S.C. § 119 to Japanese Application No. 2021-018842 filed Feb. 9, 2021 and Japanese Application No. 2021-067130 filed Apr. 12, 2021, the entire content of which is incorporated herein by reference.

BACKGROUND

Field of the Invention

At least an embodiment of the present invention relates to an optical unit.

Description of the Related Documents

Conventionally, an optical unit in which a movable body including an optical module can be rotated with respect to a fixed body has been used. For example, JP 2020-27134 discloses an optical unit having a support portion to rotatably support a movable body including an optical module with respect to a fixed body with a rolling direction (optical axis direction of the optical module) as a rotation axis.

In the optical unit disclosed in JP 2020-27134, the movable body to which a flexible printed circuit board is connected can be easily assembled to the fixed body. On the other hand, in a conventional optical unit in which the movable body can be rotated with respect to the fixed body with the optical axis direction as a rotation axis, a rotatable configuration can be realized by providing a gimbal mechanism or the like with a pitching direction, a yawing direction and the like, which are directions intersecting the optical axis direction as the rotation axes. However, the configuration as above makes it necessary to take a large movement space for the flexible printed circuit board connected to the movable body, which increases a size of the device. Therefore, at least an embodiment of the present invention reduces the size of an optical unit in which a movable body can be rotated with respect to a fixed body using three axes as rotation axes.

SUMMARY

The optical unit of at least an embodiment of the present invention comprises a movable body including an optical module and to which a flexible printed circuit board is connected, a fixed body, a rotation support mechanism to support the movable body rotatably with respect to the fixed body using an optical axis direction of the optical module as a rotation axis, and a gimbal mechanism to support the movable body rotatably with respect to the fixed body using at least two directions intersecting the optical axis direction as rotation axes, in which the movable body has a first side surface, a second side surface, a third side surface, and a fourth side surface as movable-body side surfaces each of which faces the direction intersecting the optical axis direction, the first side surface positioning on an opposite side to the third side surface, and the second side surface positioning on an opposite side to the fourth side surface, the flexible printed circuit board is connected to the movable body on the first side surface side, has a clearance provided with respect to the movable-body side surface, and has a side-surface facing region facing the movable-body side surface, and the side facing region is arranged to face the first side surface and the second side surface but not to face the third side surface or the fourth side surface.

According to this mode, the flexible printed circuit board is connected to the movable body on the first side surface side, and has a clearance provided with respect to the movable-body side surface and has a side-surface facing region facing the movable-body side surface. By having such configuration in which the side-surface facing region has a clearance provided with respect to the movable-body side surface, a movable area of the flexible printed circuit board with respect to the movable body is expanded, and the movable body can be rotated suitably with respect to the fixed body with the three axes as the rotation axes. In addition, since the flexible printed circuit board is arranged to face the side surface of the movable body by forming the side-surface facing region, a size increase of the optical unit in the direction intersecting the optical axis direction can be suppressed. Furthermore, the side-surface facing region is arranged to face the first and second side surfaces, but not to face the third surface or the fourth side surface. With the configuration facing all of the first side surface, the second side surface, the third side surface, and the fourth side surface, it is necessary to secure a space where the flexible printed circuit board is arranged in four directions in the direction intersecting the optical axis, but by disposing the flexible printed circuit board so as not to face the third side surface or the fourth side surface, the size increase of the optical unit in the direction intersecting the optical axis direction can be suppressed.

Moreover, in the optical unit of at least an embodiment of the present invention, the side-surface facing region can be configured to be arranged so as to extend from a side on the first side surface, which is the side separated away from the second side surface, to a side on the second side surface, which is separated away from the first side surface. With the configuration as above, a movement space for the flexible printed circuit board, which is required as the movable body is rotated with respect to the fixed body, can be taken wide, and it becomes easier to largely rotate the movable body with respect to the fixed body.

In the optical unit of at least an embodiment of the present invention, it can be so configured that the flexible printed circuit board is connected to the first side surface without being fixed in planar contact, and a clearance is provided between the first side surface and the entire side-surface facing region facing the first side surface. With the configuration as above, the flexible printed circuit board is arranged with a clearance provided between the flexible printed circuit board and the first side surface in a wide range. Therefore, at the position opposing the first side surface, the movement space for the flexible printed circuit board, which is required as the movable body is rotated with respect to the fixed body, can be taken wide, and it becomes easier to largely rotate the movable body with respect to the fixed body.

Moreover, in the optical unit of at least an embodiment of the present invention, it can be so configured that the flexible printed circuit board is fixed to the fixed-body side fixing portion provided on the fixed body, and the fixed-body side fixing portion is arranged only in a part of a position opposing the second side surface in the direction intersecting the optical axis direction and fixes only a part of the side-surface facing region in the optical axis direction. With the configuration as above, a fixing region for the flexible printed circuit board to the fixed body at the position opposing the second side surface can be made smaller.

Accordingly, the flexible printed circuit board can be largely moved at the position opposing the second side surface, and it becomes easier to largely rotate the movable body with respect to the fixed body.

In the optical unit of at least an embodiment of the present invention, it can be so configured that a notch is provided in the fixed-body side fixing portion, and the side-surface facing region is fixed in the notch. With the configuration as above, a part of the position opposing the second side surface in the direction intersecting the optical axis direction and a part of the side-surface facing region in the optical axis direction can be easily fixed to the fixed body.

Moreover, in the optical unit of at least an embodiment of the present invention, it can be so configured that the fixed body has a fixed-body side surface that surrounds the movable body in a direction intersecting the optical axis direction and the side-surface facing region is arranged in a clearance between the movable-body side surface and the fixed-body side surface. With the configuration as above, movement of the flexible printed circuit board as the movable body is rotated with respect to the fixed body and contact with an external constituent member can be suppressed by the fixed-body side surface, and the flexible printed circuit board can be suitably arranged without increasing a size of the optical unit.

Moreover, in the optical unit of at least an embodiment of the present invention, it can be so configured that the movable body has a holder to hold the optical module and a holder support portion to support the holder, and the rotation support mechanism has a holder fixing portion fixed to the holder, a holder support-portion fixing portion fixed to the holder support portion, and an elastic portion to connect the holder fixing portion and the holder support-portion fixing portion. With the configuration as above, the rotation support mechanism can be formed in a simple and compact manner.

Furthermore, in the optical unit of at least an embodiment of the present invention, the gimbal mechanism can be so configured to have a fixed-body side leg portion connected to the fixed body, a movable-body side leg portion connected to the movable body, and a gimbal frame portion in which the fixed-body side leg portion and the movable-body side leg portion are provided, and when viewed from the optical axis direction, the position of the elastic portion is displaced with respect to the positions of the fixed-body side leg portion and the movable-body side leg portion. With the configuration as above, when the movable body is rotated with respect to the fixed body with the optical axis direction as a rotation axis, interference of the elastic portion with the fixed-body side leg portion or the movable-body side leg portion can be suppressed.

Moreover, in the optical unit of at least an embodiment of the present invention, it can be so configured to include a bending holding portion to hold the flexible printed circuit board in a bent state so that the side-surface facing region faces the first side surface and the second side surface. With the configuration as above, a posture of the flexible printed circuit board can be suitably maintained, and interference of the flexible printed circuit board with the fixed body or the movable body can be suppressed.

Moreover, in the optical unit of at least an embodiment of the present invention, it can be so configured that the flexible printed circuit board is bent in a curved-surface state so that the side-surface facing region faces the first side surface and the second side surface. With the configuration as above, a load applied to the flexible printed circuit board associated with bending of the flexible printed circuit board can be alleviated.

Moreover, in the optical unit of at least an embodiment of the present invention, the flexible printed circuit board can be so configured that, as the side-surface facing region facing the first side surface, an opposing surface opposing the first side surface is provided from a connection portion in connection with the movable body via an intersecting surface intersecting the first side surface toward the second side surface side along the first side surface. With the configuration as above, the movable body can be largely moved with respect to the fixed body by the intersecting surface easily in the optical axis direction.

Moreover, in the optical unit of at least an embodiment of the present invention, a length of the intersecting surface in the direction along the first side surface toward the second side surface side can be configured to be 0.5 times or more and 2.0 times or less of the length of the opposing surface in the direction along the first side surface toward the second side surface side. With the configuration as above, the movable body can be largely moved with respect to the fixed body easily with a good balance in both the optical axis direction by the intersecting surface and the direction intersecting the first side surface by the opposing surface.

Furthermore, in the optical unit of at least an embodiment of the present invention, it can be so configured that the intersecting surface extends from the connection portion in connection with the movable body into a direction intersecting the first side surface and then, via a first curved portion, toward the second side surface side along the first side surface, and the first curved portion has a round outer shape. With the configuration as above, as compared with a configuration in which an outer side of the first curved portion has an angular shape, not a round one, when the movable body is rotated with respect to the fixed body, a movement amount of the outer side portion of the first curved portion can be reduced. In other words, interference of the flexible printed circuit board with the other constituent members can be suppressed.

In the optical unit of at least an embodiment of the present invention, it can be so configured that the opposing surface extends from the intersecting surface side into a direction intersecting the intersecting surface and then, via the second curve portion, toward the second side surface side along the first side surface, and the second curved portion has a round outer shape. With the configuration as above, as compared with a configuration in which an outer side of the second curved portion has an angular shape, not a round one, when the movable body is rotated with respect to the fixed body, the movement amount of the outer side portion of the second curved portion can be reduced. In other words, interference of the flexible printed circuit board with the other constituent members can be suppressed.

Moreover, in the optical unit of at least an embodiment of the present invention, the connection portion in connection with the movable body can be configured to be at a position on the first side surface, which is the side separated away from the second side surface, and does not include the most separated position from the second side surface. With the configuration as above, wiring can be made simple and compact.

Moreover, in the optical unit of at least an embodiment of the present invention, the opposing surface can be so configured to have a curved portion protruding in a direction separated away from the intersecting surface when viewed from the side facing the opposing surface, and to go from the intersecting surface side toward the second side surface side. With the configuration as above, it is possible to suppress the bent portion from becoming longer due to variation of the bending position or the like when the flexible printed circuit board is bent.

The optical unit of at least an embodiment of the present invention, in which the movable body can be rotated with respect to the fixed body using three axes as rotation axes, can be made compact.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

An embodiment of the present invention will be described below on the basis of the drawings. In each of the figures, an X-axis, a Y-axis and a Z-axis represent directions orthogonal to each other, and it is assumed that a view as seen in a +X direction and a −X direction is referred to as a side view, a view as seen in a +Y direction is referred to as a plan view, a view as seen in a −Y direction is referred to as a bottom view, a view as seen in a +Z direction is referred to as a rear view, and a view as seen in a −Z direction is referred to as a front view. Further, the +Y direction corresponds to an incident direction D1 of a light flux from outside.

Outline of Device Including Optical Unit

Figure 1:
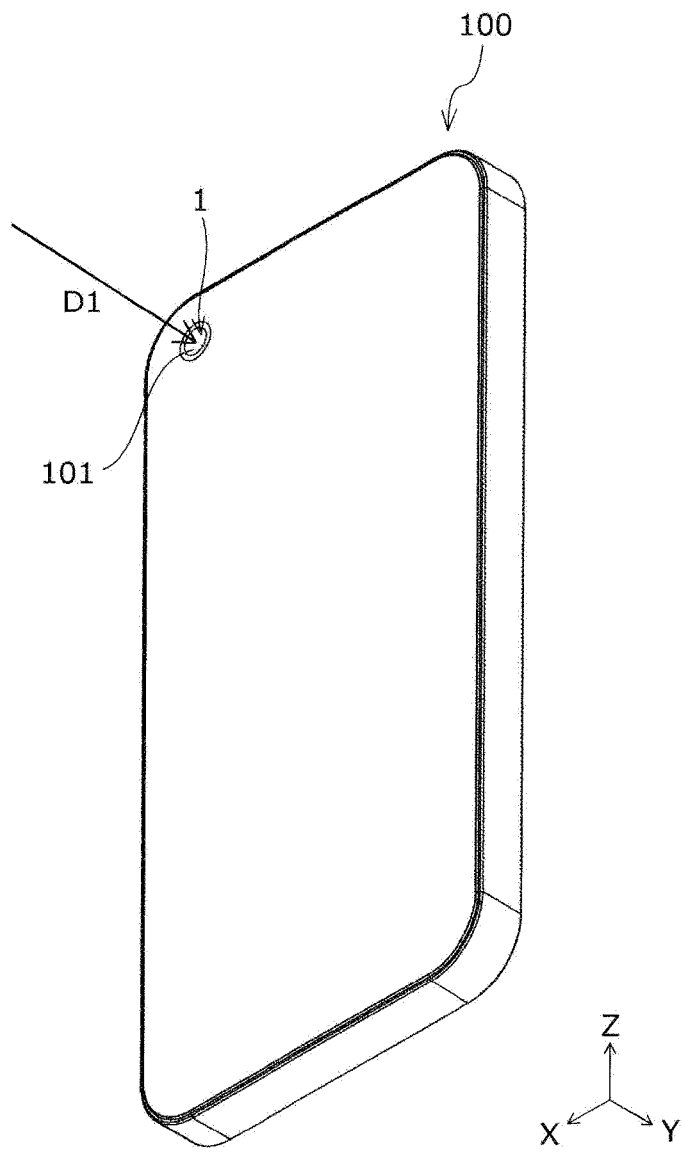
FIG. 1 is a perspective view of a smartphone including an optical unit according to one embodiment of the present invention.

First, an optical unit 1 according to an embodiment 1 of the present invention will be described. FIG. 1 is a schematic perspective view of a smartphone 100 as an example of a device including the optical unit 1 of this embodiment. The optical unit 1 of the present embodiment can be used suitably in the smartphone 100. The optical unit 1 of this embodiment can be configured to be thin, since a thickness in the Y-axis direction of the smartphone 100 can be configured thin. However, the optical unit 1 of this embodiment is not limited to the smartphone 100 but can be used in various devices without particular limitation, such as cameras and videos.

As shown in FIG. 1, the smartphone 100 includes a cover glass 101 to which a light flux is incident. Inside the cover glass 101 of the smartphone 100, the optical unit 1 is provided. The smartphone 100 is configured to allow the light flux to be incident from an outside in the incident direction D1 via the cover glass 101 so that a subject image can be picked up on the basis of the incident light flux.

Outline of Overall Configuration of Optical Unit

Using FIGS. 2 to 6, an outline of the configuration of the optical unit 1 according to this embodiment will be described. The optical unit 1 includes a movable body 14 provided with an optical module 12, such as a lens 12a, and an imaging element 50, and a fixed body 16 which is held in a state displaceable in a direction (pitching direction) with the X-axis direction as a rotation axis (swing axis), in a direction (yawing direction) with the Z-axis direction as the rotation axis (swing axis), and in a direction (rolling direction) with the Y-axis direction as the rotation axis (swing axis). Moreover, a drive mechanism 18 (a drive mechanisms 18A, a drive mechanism 18B, and a drive mechanism 18C) to drive the movable body 14 in the pitching direction, in the yawing direction, and in the rolling direction, a gimbal mechanism 20 to support the movable body 14 with respect to the fixed body 16, capable of rotation (swing) in the pitching direction and in the yawing direction, and a rotation support mechanism 60 to support the movable body 14 with respect to the fixed body 16, capable of rotation (swing) in the rolling direction.

Movable Body

Figure 5:
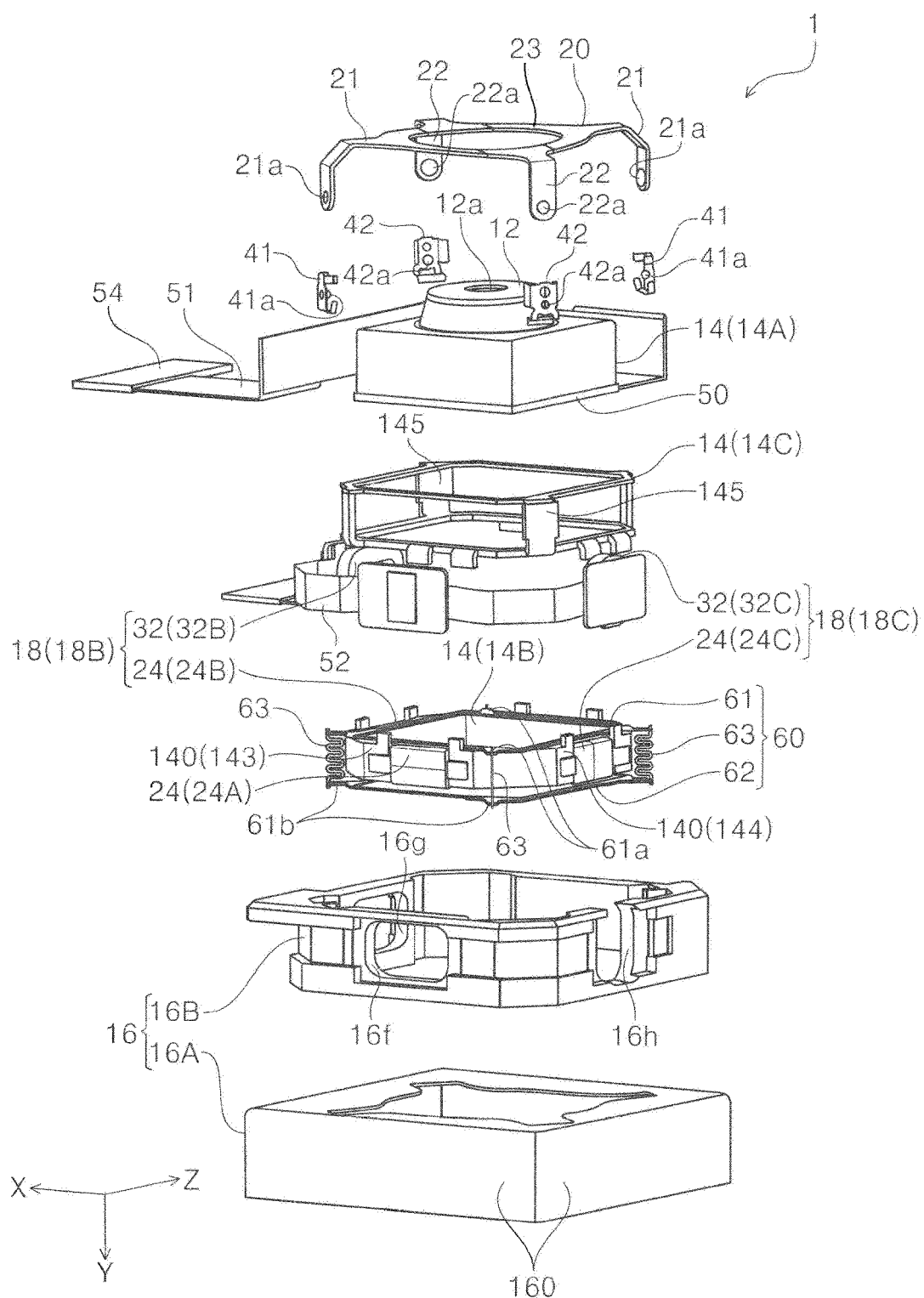
FIG. 5 is an exploded perspective view of the optical unit according to the embodiment of the present invention.
Figure 6:
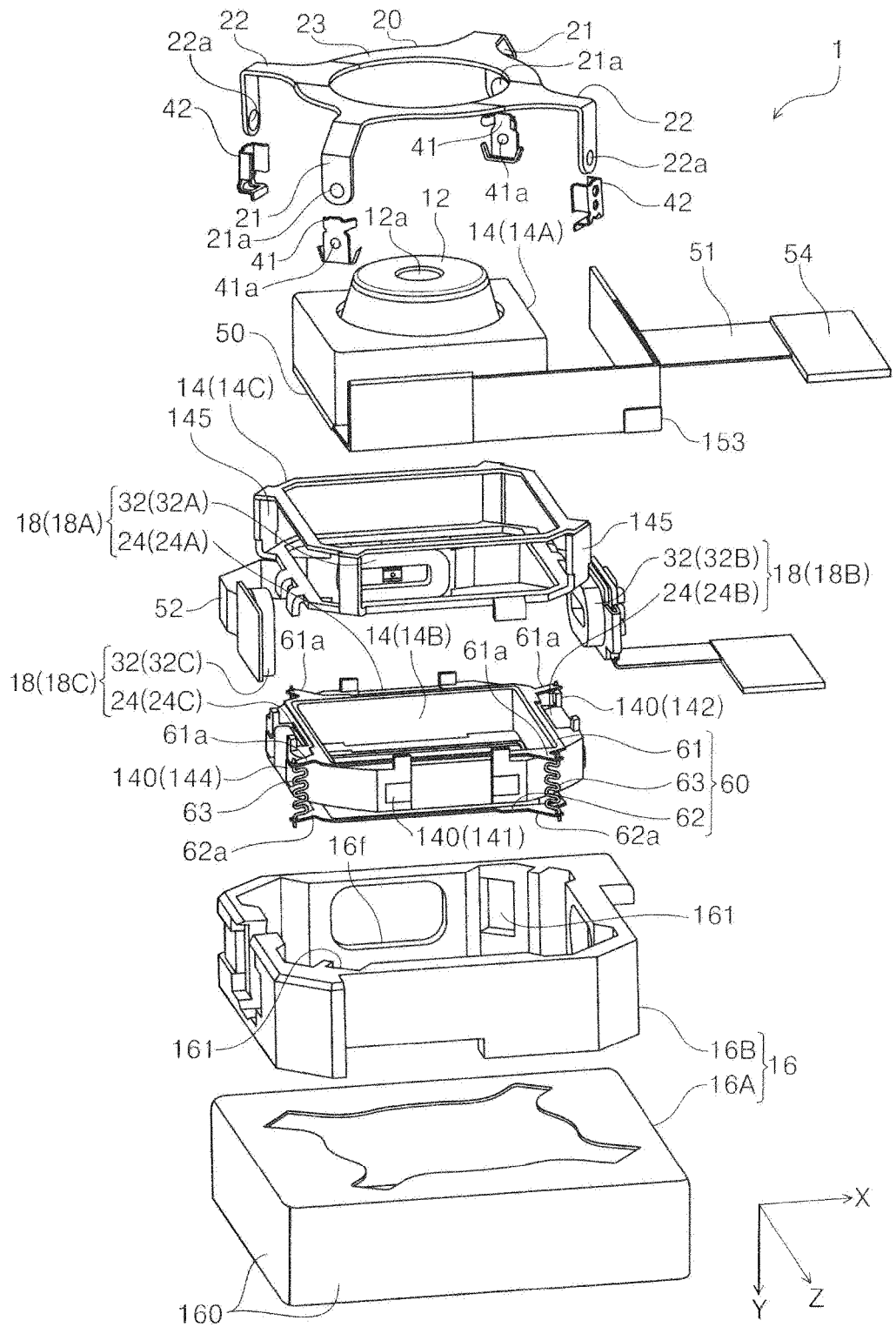
FIG. 6 is an exploded perspective view of the optical unit according to the embodiment of the present invention viewed from an angle different from that in FIG. 5.

In addition, the optical unit 1 in this embodiment has, as the movable body 14, a movable-body main body 14A, a holder 14B, and a holder support portion 14C, as shown in FIGS. 5 and 6 and the like. The movable-body main body 14A has an optical module 12. In addition, the holder 14B holds the movable-body main body 14A and has magnets 24 (a magnet 24A, a magnet 24B, and a magnet 24C) constituting the drive mechanism 18 provided. The holder support portion 14C is constituted by a substantially rectangular frame and accommodates the holder 14B inside.

The movable-body main body 14A has the imaging element 50, and a flexible printed circuit board 51 is connected to the imaging element 50. The imaging element 50 is attached to the movable-body main body 14A, and the imaging element 50 and the flexible printed circuit board 51 connected to the imaging element 50 can be considered to constitute a part of the movable-body main body 14A.

The holder 14B is constituted as a rectangular frame-shaped member provided to surround the remaining four surfaces, excluding a front surface on which the lens 12a of the optical module 12 is provided (the surface on the subject side corresponding to the −Y direction side) and a rear surface on a side opposite thereto. The holder 14B is surrounded by the holder support portion 14C, a periphery of which is constituted by a substantially cuboid framework. Here, the holder 14B is constituted capable of detaching/attaching the optical module 12 as an example. However, the optical module 12 and the holder 14B may be constituted integrally. In the holder 14B, the magnet 24A, the magnet 24B, and the magnet 24C for pitching, yawing, and rolling corrections are attached to outer surfaces by using three surfaces of movable-body side surfaces 140 opposing fixed-body side surfaces 160 of the fixed body 16. In detail, the magnet 24A for pitching correction is attached to a third side surface 143 of the movable-body side surfaces 140, the magnet 24B for yawing correction is attached to a second side surface 142 of the movable-body side surfaces 140, and the magnet 24C for rolling correction is attached to a fourth side surface 144 of the movable-body side surfaces 140.

Fixed Body

Moreover, the optical unit 1 of this embodiment includes the fixed body 16 as shown in FIGS. 2 to 6. And, as the fixed body 16, an outer cover portion 16A having the fixed-body side surface 160 and the like and a frame body portion 16B which encloses the movable body 14 and is accommodated inside the outer cover portion 16A are provided. The frame body portion 16B is a rectangular frame-shaped member provided so as to surround the remaining four surfaces excluding the surface on the subject side and the rear surface on the side opposite thereto. And the frame body portion 16B has a coil 32A at a position opposing the magnet 24A, a coil 32B at a position opposing the magnet 24B, and a coil 32C at a position opposing the magnet 24C. In FIGS. 5 and 6, the coil 32A, the coil 32B, and the coil 32C are illustrated at positions separated away from the frame body portion 16B, but the coil 32A is arranged at a coil disposition position 16f (see FIG. 5) of frame body portion 16B, the coil 32B is arranged at a coil disposition position 16g (see FIG. 5) of the fixed body 16, and the coil 32C is arranged at a coil disposition position 16h (see FIG. 5) of the fixed body 16. Note that, in this embodiment, in the coils 32, the coil 32A, the coil 32B, and the coil 32C are all constituted as wound coils as an example, but the coil 32 may be constituted as a pattern substrate (coil substrate) which takes the coil 32 as a pattern in substrate wiring.

Optical Module

Note that the optical module 12 in this embodiment can be used for a thin camera and the like mounted on a camera-equipped mobile phone other than the smartphone, a tablet-type PC or the like other than the smartphone 100, for example. The optical module 12 includes the lens 12a on the subject side, and optical devices and the like for imaging are built in.

Here, the optical unit 1 in this embodiment incorporates the drive mechanism 18 to correct pitching runout (runout in a rotational movement direction with the X-axis direction as the rotation axis), yawing runout (runout in the rotational movement direction with the Z axis direction as the rotation axis) and rolling runout (runout in the rotational movement direction with the Y axis direction as the rotation axis) caused in the optical module 12. And it is so configured that the pitching runout, the yawing runout, and the rolling runout can be corrected. In detail, the correction of the pitching runout is performed by driving a drive mechanism 18A (the coil 32A) of the drive mechanism 18, the correction of the yawing runout is performed by driving a drive mechanism 18B (the coil 32B) of the drive mechanism 18, and the correction of the rolling runout is performed by driving a drive mechanism 18C (the coil 32C) of the drive mechanism 18.

Drive Mechanism

In this embodiment, in a state where the movable body 14 is arranged in the fixed body 16, the magnet 24A and the coil 32A, the magnet 24B and the coil 32B, and the magnet 24C and the coil 32C are in a state opposing each other, respectively. In addition, as described above, a pair of the magnet 24A and the coil 32A, a pair of the magnet 24B and the coil 32B, and a pair of the magnet 24C and the coil 32C constitute the drive mechanism 18A, the drive mechanism 18B, and the drive mechanism 18C, respectively. Then, these drive mechanisms 18 correct the pitching, the yawing, and the rolling of the movable body 14.

Moreover, the corrections of the pitching, the yawing and the rolling are performed as follows. When runout in at least one of the pitching direction, the yawing direction, and the rolling direction occurs in the optical unit 1, the runout is detected by a magnetic sensor (Hall element), and the drive mechanism 18 is driven on the basis of the result. Alternatively, a runout detection sensor (gyroscope) or the like may be used to detect the runout of the optical unit 1. On the basis of the detection result of the runout, the drive mechanism 18 acts to correct the runout. That is, a current is made to flow through each of the coils 32 to move the movable body 14 in a direction where the runout of the optical unit 1 is cancelled and thus, the runout is corrected.

As described above, the optical unit 1 of this embodiment includes the drive mechanism 18 to rotate the movable body 14 with respect to the fixed body 16 with the axial direction of the pitching, the axial direction of yawing, and the axial direction of the rolling as the rotation axes. Here, the drive mechanism 18 is preferably arranged at a position other than a side where the flexible printed circuit board 51 is connected to the movable body 14 (+Z direction side). Since the drive mechanism 18 can be arranged on the side where the flexible printed circuit board 51 is not formed, it is not necessary anymore to increase a size of the optical unit 1 in order to suppress contact between the drive mechanism 18 and the flexible printed circuit board 51, and the optical unit 1 can be made compact. Note that the term "rotation" in this description does not require 360° rotation but has a meaning including a case of swing in the rotation direction.

Here, as shown in FIGS. 5 and 6 and the like, the coil 32A, the coil 32B, and the coil 32C are all connected and fixed to a flexible printed circuit board 52. In the optical unit 1 of this embodiment, the flexible printed circuit board 52 is fixed to the fixed body 16 so that the coil 32A, the coil 32B, and the coil 32C are fixed to desired positions (the coil disposition position 16f, the coil disposition position 16g, and the coil disposition position 16h) of the fixed body 16.

Gimbal Mechanism

The gimbal mechanism 20 of this embodiment is a configuration with a spring property formed by bending a flat-plate material made of metal. Specifically, as shown in FIGS. 5 and 6 and the like, the gimbal mechanism 20 is configured to include, as an example, a gimbal frame portion 23 provided on the subject side, a first leg portion 21 and a second leg portion 22 formed by being bent at 90° in the optical axis direction from four corner portions of the gimbal frame portion 23. Note that, regarding the first leg portion 21 and the second leg portion 22, all of them do not necessarily have to be plate shaped, and only a part of them may be formed having a plate shape so as to exert the spring property. Moreover, one of the first leg portion 21 and the second leg portion 22 may have another shape other than the plate shape (such as a rod shape).

In the gimbal mechanism 20 of this embodiment, an inwardly concave curved surface 21a is provided on the first leg portion 21, and an inwardly concave curved surface 22a is provided on the second leg portion 22. The first leg portion 21 is so configured that a force is applied so that the concave curved surface 21a spreads outwardly, and the second leg portion 22 is so configured that a force is applied so that the concave curved surface 22a spreads outwardly.

Note that, at a position opposing the concave curved surface 21a of the frame body portion 16B, a fixed-body side support portion 41 to which a spherical convex curved surface 41a protruding inwardly and fitting in the concave curved surface 21a is attached is provided. Moreover, at a position opposing the concave curved surface 22a of the holder support portion 14C, a movable-body side support portion 42 to which a spherical convex curved surface 42a protruding inwardly and fitting in the concave curved surface 22a is attached is provided. Note that, the fixed-body side support portion 41 is attached to an attaching position 161 of the frame body portion 16B as the fixed body 16, and the movable-body side support portion 42 is attached to an attaching position 145 of the holder support portion 14C as the movable body 14.

Here, in the optical unit 1 of this embodiment, by disposing the convex curved surface 41a in the concave curved surface 21a and by pressing the concave curved surface 21a against the convex curved surface 41a, the gimbal mechanism 20 is supported rotatably with respect to the fixed body 16 with a first axis L1 (see FIG. 2) as the rotation axis. In addition, in the optical unit 1 of this embodiment, by disposing the convex curved surface 42a in the concave curved surface 22a and by pressing the concave curved surface 22a against the convex curved surface 42a, the movable body 14 is supported rotatably with respect to the gimbal mechanism 20 with a second axis L2 (see FIG. 2) as the rotation axis. In other words, the gimbal mechanism 20 of this embodiment is configured to rotatably support the movable body 14 with respect to the fixed body 16 with all the directions intersecting the optical axis direction (Y-axis direction) as the rotation axes by rotatably supporting the gimbal mechanism 20 with respect to the fixed body 16 with the first axis L1 as the rotation axis and by rotatably supporting the movable body 14 with respect to the gimbal mechanism 20 with the second axis L2 as the rotation axis. And the optical unit 1 of this embodiment is configured such that, by driving the drive mechanism 18A and the drive mechanism 18B, the movable body 14 can be rotated with respect to the fixed body 16 with the pitching direction and the yawing direction as rotation axes.

Rotation Support Mechanism

The rotation support mechanism 60 of this embodiment has, as shown in FIGS. 5 and 6, a substantially rectangular first frame portion 61, a substantially rectangular second frame portion 62, and an elastic portion 63 which connects the first frame portion 61 and the second frame portion 62. In the first frame portion 61, protruding portions 61a are formed at the four corners, and in the second frame portion 62, protruding portions 62a are formed at the four corners. And each of the protruding portion 61a and the protruding portion 62a is connected to each other by the elastic portion 63. The elastic portion 63 is a plate spring made of metal in which a plurality of curved portions curved in a direction intersecting the optical axis direction are formed. And a curving direction of the curved portion (the direction in which the a concave/convex is directed) is a direction toward a third axis L3 (see FIG. 4) extending in the Y-axis direction. For this reason, it is so configured that the first frame portion 61 and the second frame portion 62 rotate easily with the third axis L3 as the rotation axis, but do not get closer or to be separated easily in the direction along the Y-axis direction.

And the first frame portion 61 is fixed to a surface on the −Y direction side of the holder 14B, and the second frame portion 62 is fixed to a framework portion on the +Y direction side of the holder support portion 14C. Therefore, the holder 14B can rotate easily with respect to the holder support 14C with the third axis L3 as the rotation axis. Note that, as described above, the holder support portion 14C is supported on the frame body portion 16B as the fixed body 16 via the gimbal mechanism 20, and the holder 14B is supported by the holder support portion 14C via the rotation support mechanism 60. Therefore, the movable-body main body 14A having the optical module 12 rotates easily with respect to the fixed body 16 with the third axis L3 as the rotation axis via the holder 14B, the rotation support mechanism 60, the holder support portion 14C, and the gimbal mechanism 20.

Arrangement of Flexible Printed Circuit Board Connected to Movable Body

Figure 7:
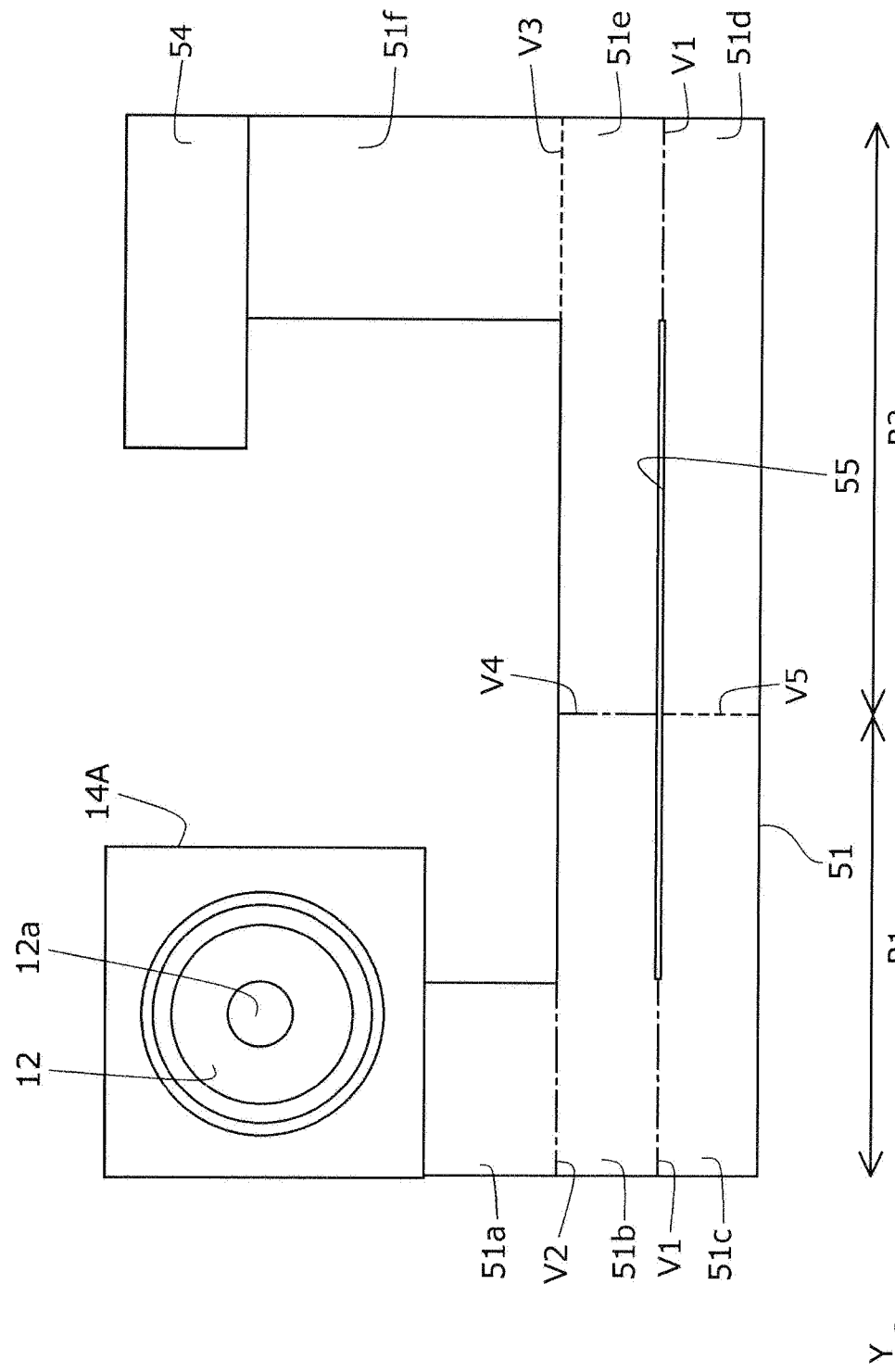
FIG. 7 is a schematic view illustrating an unfolded state of a flexible printed circuit board in the optical unit according to the embodiment of the present invention.

In the following, in addition to FIGS. 2 to 6, arrangement of the flexible printed circuit board 51 connected to the movable body 14 will be described by referring to FIG. 7. Note that, as described above, the optical unit 1 of this embodiment includes the movable body 14 having the optical module 12 and to which the flexible printed circuit board 51 is connected, the fixed body 16, the rotation support mechanism 60 which rotatably supports the movable body 14 with respect to the fixed body 16 with the optical axis direction (Y-axis direction: rolling direction) of the optical module 12 as the rotation axis, and the gimbal mechanism 20 which rotatably supports the movable body 14 with respect to the fixed body 16 with at least two directions (X-axis direction: pitching direction, Z-axis direction: yawing direction) intersecting the optical axis direction as the rotation axes.

Figure 3:
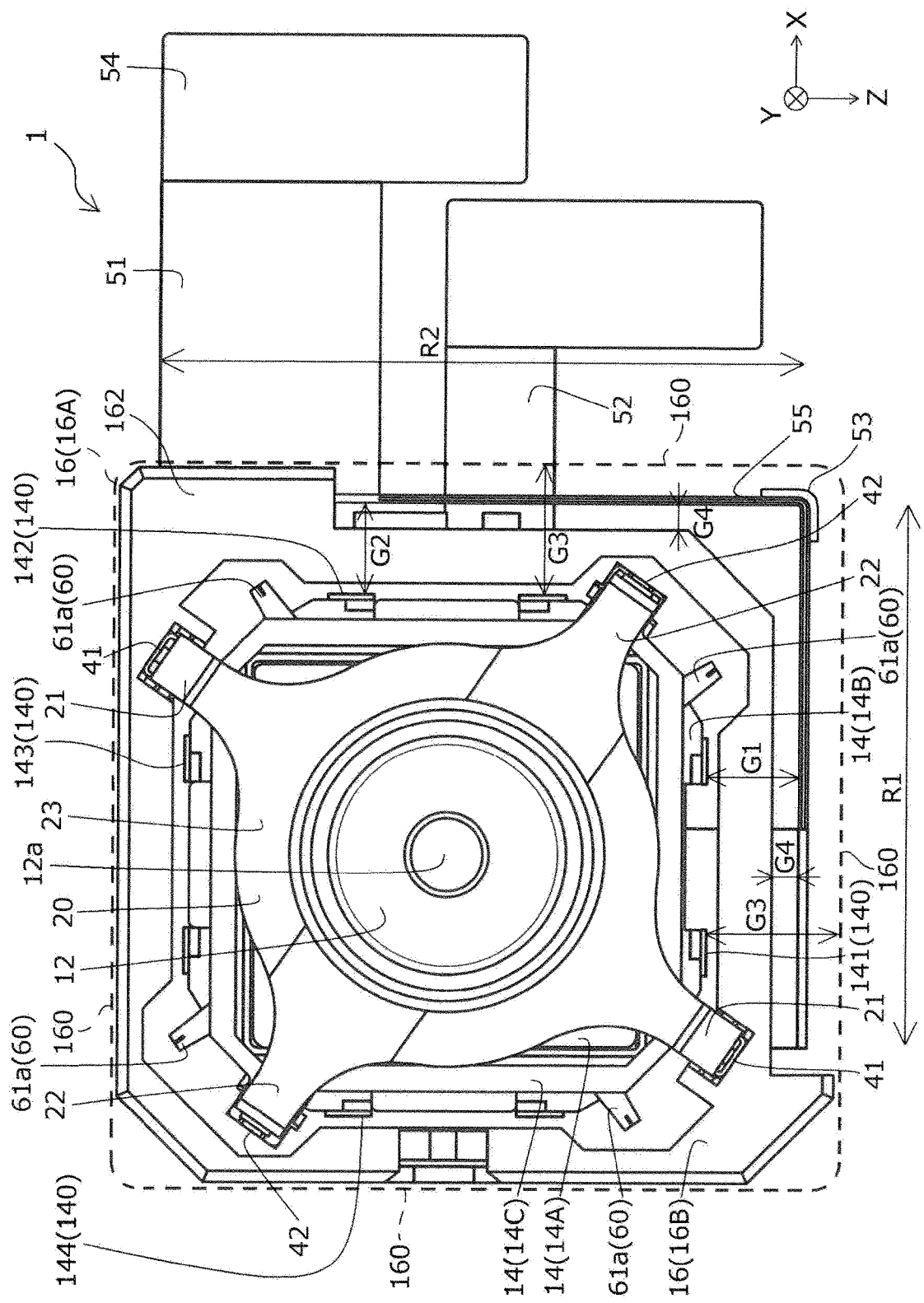
FIG. 3 is a partially omitted plan view illustrating a part of a fixed body of the optical unit according to the embodiment of the present invention.

As described above, the optical unit 1 of this embodiment has movable-body side surfaces 140, each of which faces the direction intersecting the optical axis direction, on the holder 14B of the movable body 14. And as shown in FIGS. 3, 5 and 6, as the movable-body side surface 140, a first side surface 141, the second side surface 142, the third side surface 143, and the fourth side surface 144 are provided. In detail, as shown in FIG. 3 and the like, the first side surface 141 facing an opposite side to the third side surface 143, and the second side surface 142 facing an opposite side to the fourth side surface 144.

Here, as shown in FIG. 3, the flexible printed circuit board 51 is connected to the movable body 14 on the first side surface 141 side, has clearances G1 and G2 provided with respect to the movable-body side surfaces 140, and has side-surface facing regions R1 and R2 facing the movable-body side surfaces 140. And the side-surface facing regions R1 and R2 are arranged so as to face the first side surface 141 and the second side surface 142 and not to face the third side surface 143 and the fourth side surface 144. In other words, the side-surface facing regions R1 and R2 are arranged to face only a part of the side surfaces of the movable-body side surfaces 140.

As described above, With such configuration that the side-surface facing regions R1 and R2 have the clearances G1 and G2 provided with respect to the movable-body side surfaces 140, a movable range of the flexible printed circuit board 51 with respect to the movable body 14 is expanded, and the movable body 14 can be suitably rotated with respect to the fixed body 16 with the three axes as rotation axes. In addition, since the flexible printed circuit board 51 has the side-surface facing regions R1 and R2 facing the movable-body side surfaces 140 as above, the flexible printed circuit board 51 is arranged by facing the movable-body side surfaces 140 instead of being arranged with the surface facing the direction intersecting the movable-body side surfaces 140 and thus, the size increase of the optical unit 1 in the direction intersecting the optical axis direction can be suppressed. Since the flexible printed circuit board has a substantially planar shape, the thickness is smaller than the width, and in the configuration in which the flexible printed circuit board 51 is arranged in the direction intersecting the movable-body side surface 140, the length corresponding to the width of the flexible printed circuit board 51 directly leads to the size increase of the optical unit 1.

In addition, in the case of a configuration facing all of the first side surface 141, the second side surface 142, the third side surface 143, and the fourth side 144 (configuration facing all the side surfaces in the movable-body side surfaces 140), a space to arrange the flexible printed circuit board 51 in four directions in the directions intersecting the optical axis direction needs to be secured. However, by arranging the flexible printed circuit board 51 so that it does not face the third side surface 143 or the fourth side surface 144 as in this embodiment, the size increase of the optical unit 1 in the direction intersecting the optical axis direction can be suppressed. Note that, in the configuration in which the flexible printed circuit board 51 is arranged so as to face only the first side surface 141, the movement space for the flexible printed circuit board 51 is limited and it may become difficult to largely rotate the movable body 14 with respect to the fixed body 16, but by arranging the flexible printed circuit board 51 so as to face the first side surface 141 and the second side surface 142, it becomes easy to largely rotate the movable body 14 with respect to the fixed body 16.

Moreover, as shown in FIG. 3, in the optical unit 1 of this embodiment, the side-surface facing regions R1 and R2 are arranged from the side (−X direction side) separated away from the second side surface 142 in the first side surface 141 to the side (−Z direction side) separated away from the first side surface 141 in the second side 142. Since the optical unit 1 of this embodiment is configured as above, the movement space for the flexible printed circuit board 51, which is required as the movable body 14 is rotated with respect to the fixed body 16, can be taken wide, and it becomes easier to largely rotate the movable body 14 with respect to the fixed body 16. Note that the phrase "from the side (−X direction side) separated away from the second side surface 142 in the first side surface 141 to the side (−Z direction side) separated away from the first side surface 141 in the second side surface 142" means that it is only necessary to be from the side more separated away from the second side surface 142 than the center in the X-axis direction of the first side surface 141 to the side more separated away from the first side surface 141 than the center in the Z-axis direction of the second side surface 142.

Moreover, as shown in FIG. 3 and the like, in the optical unit 1 of this embodiment, it is so configured that the flexible printed circuit board 51 is connected to the first side surface 141 without being fixed in planar contact, and the entire side-surface facing region R1 facing the first side surface 141 has the clearance G1 provided with respect to the first side surface 141. Since the optical unit 1 of this embodiment is configured as above, the flexible printed circuit board 51 is arranged with the clearance G1 provided between the flexible printed circuit board 51 and the first side surface 141 in a wide range. Therefore, in the optical unit 1 of this embodiment, at the position opposing the first side surface 141, the movement space for the flexible printed circuit board 51, which is required as the movable body 14 is rotated with respect to the fixed body 16, can be taken wide, and it becomes easier to largely rotate the movable body 14 with respect to the fixed body 16.

Figure 4:
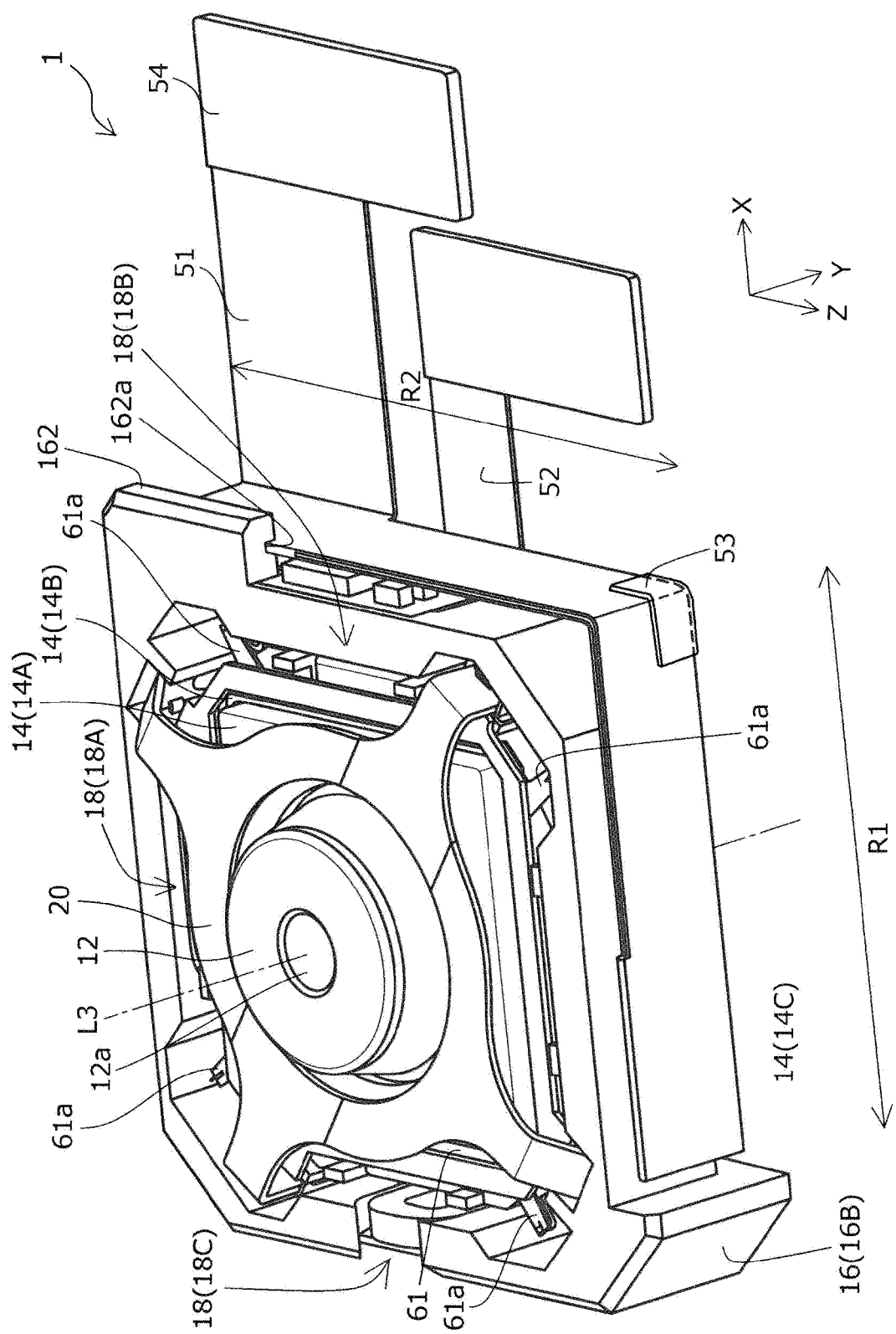
FIG. 4 is a partially omitted perspective view illustrating a part of the fixed body of the optical unit according to the embodiment of the present invention.

Moreover, as shown in FIGS. 3 and 4, in the optical unit 1 of this embodiment, the flexible printed circuit board 51 is fixed to a fixed-body side fixing portion 162 provided on the fixed body 16. Then, the fixed-body side fixing portion 162 fixes only a part of the side-surface facing region R2. In detail, the fixed-body side fixing portion 162 is configured to be arranged only at a part of the position opposing the second side surface 142 in the Z-axis direction (only a part of the −Z direction side), which is a direction intersecting the optical axis direction and to fix only a part of the side-surface facing region R2 in the Y-axis direction (only a part of the −Y direction side), which is the optical axis direction. Since the optical unit 1 of this embodiment is configured as above, a fixing region of the flexible printed circuit board 51 at the position opposing the second side surface 142 with respect to the fixing body 16 is made smaller. Accordingly, in the optical unit 1 of this embodiment, the flexible printed circuit board 51 can be largely moved at the position opposing the second side surface 142, and it becomes easier to largely rotate the movable body 14 with respect to the fixed body 16.

In detail, in the optical unit 1 of this embodiment, as shown in FIG. 4, a notch 162a is provided in the fixed-body side fixing portion 162, and the side-surface facing region R2 is fixed to the notch 162a. Since the optical unit 1 of this embodiment is configured as above, a part of the position opposing the second side surface 142 in the direction intersecting the optical axis direction and a part of the side-surface facing region R2 in the optical axis direction can be easily fixed to the fixed body 16.

Figure 2:
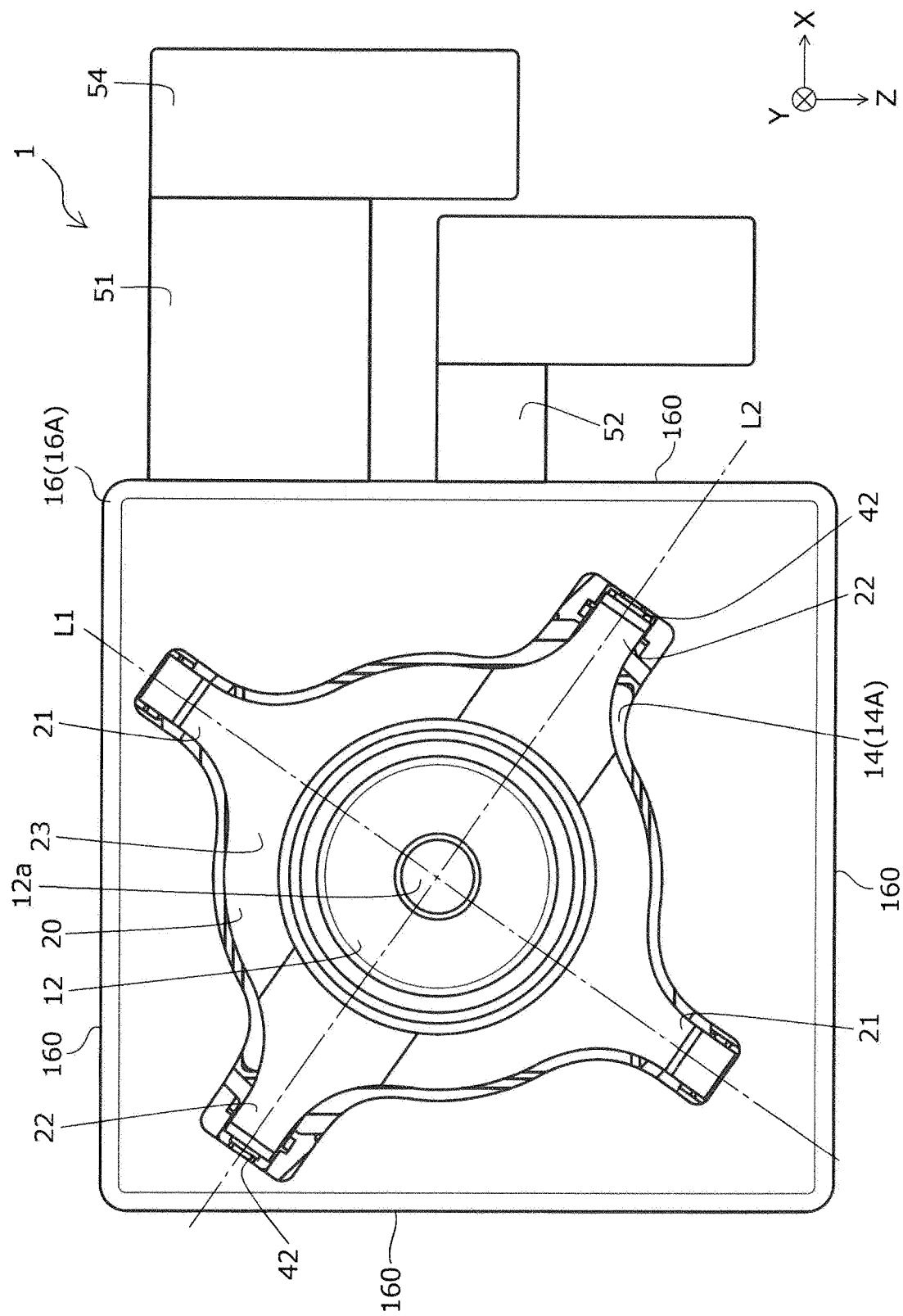
FIG. 2 is a plan view of an optical unit according to the embodiment of the present invention.

Moreover, as shown in FIG. 2 and the like, in the optical unit 1 of this embodiment, the outer cover portion 16A as the fixed body 16 has the fixed-body side surfaces 160 which surrounds the movable body 14 in the direction intersecting the optical axis direction. And, as shown in FIG. 3, the side-surface facing regions R1 and R2 are configured to be arranged in clearances G3 between the movable-body side surfaces 140 and the fixed-body side surfaces 160. Since the optical unit 1 of this embodiment is configured as above, movement of the flexible printed circuit board 51 as the movable body 14 is rotated with respect to the fixed body 16 and contact with an external constituent member (a constituent member other than the optical unit 1 in the smartphone 100, for example) can be suppressed by the fixed-body side surface 160, and the flexible printed circuit board 51 can be suitably arranged without increasing the size of the optical unit 1 arging the optical unit 1.

In this embodiment, as shown in FIG. 3, the frame body portion 16B is configured to be arranged in the clearance G3. In the configuration as above, the side-surface facing regions R1 and R2 are preferably arranged so that the clearance G4 is generated also with respect to the frame body portion 16B.

In addition, as described above, in the optical unit 1 of this embodiment, the movable body 14 has the holder 14B which holds the optical module 12 and the movable-body main body 14A having a connection portion of the flexible printed circuit board 51 and the holder support portion 14C which supports the holder 14B. And the rotation support mechanism 60 has the first frame portion 61 as a holder fixing portion fixed to the holder 14B, the second frame portion 62 as a holder support-portion fixing portion fixed to the holder support portion 14C, and the elastic portion 63 which connects the first frame portion 61 and the second frame portion 62 to each other. Since the optical unit 1 of this embodiment is configured as above, the rotation support mechanism 60 can be formed in a simple and compact manner.

In addition, as described above, in the optical unit 1 of this embodiment, the gimbal mechanism 20 has the first leg portion 21, which is a fixed-body side leg portion connected to the fixed body 16, the second leg portion 22, which is a movable-body side leg portion connected to the movable body 14, and the gimbal frame portion 23 in which the first leg portion 21 and the second leg portion 22 are provided. And, as shown in FIG. 3, when viewed from the optical axis direction, the position of the protruding portion 61a, which is a connecting position of the elastic portion 63, is displaced with respect to the position of the first leg portion 21 and the position of the second leg portion 22. In other words, when viewed from the optical axis direction, the position of the elastic portion 63 is displaced with respect to the positions of the first leg portion 21 and the second leg portion 22. Since the optical unit 1 of this embodiment has the configuration as above, when the movable body 14 rotates with respect to the fixed body 16 with the optical axis direction as the rotation axis, interference of the elastic portion 63 with the first leg portion 21 or the second leg portion 22 is suppressed.

In addition, as shown in FIGS. 3 and 4 and the like, the optical unit 1 of this embodiment includes a bending holding portion 53, which is sheet metal that holds the flexible printed circuit board 51 in a bent state so that the side-surface facing regions R1 and R2 face the first side surface 141 and the second side surface 142. Since the optical unit 1 of this embodiment is configured as above, a posture of the flexible printed circuit board 51 can be suitably maintained, and interference of the flexible printed circuit board 51 with the fixed body 16 or the movable body 14 is suppressed. However, the configuration may be such that the bending holding portion 53 is not provided.

Note that, in the optical unit 1 of this embodiment, the flexible printed circuit board 51 is held in a bent state so as to be at an angle of approximately 90° at a boundary portion between the side-surface facing region R1 and the side-surface facing region R2, but is not limited to this configuration. The flexible printed circuit board 51 may be bent in a curved-surface state at the boundary portion between the side-surface facing region R1 and the side-surface facing area R2, for example, may be bent plural times at an obtuse angle, or may be bent by interweaving a mountain fold and a valley fold.

As described above, by bending the flexible printed circuit board 51 in a curved-surface state so that the side-surface facing regions R1 and R2 face the first side surface 141 and the second side surface 142, a load on the flexible printed circuit board 51 associated with the bending of the flexible printed circuit board 51 can be reduced.

Moreover, in the optical unit 1 of this embodiment, the side-surface facing regions R1 and R2 of the flexible printed circuit board 51 are doubled by the flexible printed circuit board 51 being bent by approximately 180°. Referring to FIG. 6, details of a bending method of the flexible printed circuit board 51 of this embodiment will be described below.

FIG. 6 is an exploded view of the flexible printed circuit board 51. Note that a mountain fold line and a valley fold line described below are both based on the state shown in FIG. 6. As shown in FIG. 6, the flexible printed circuit board 51 has a region 51a connected to the imaging element 50 of the movable body 14, a region 51b and a region 51c forming the side-surface facing region R1, a region 51d and a region 51e forming the side-surface facing region R2, and a region 51f in which a connection portion 54 with the outside is provided. In the state shown in FIG. 6, the region 51a, the region 51b, the region 51c, the region 51d, the region 51e, and the region 51f are in the form of a single plane.

When the flexible printed circuit board 51 is incorporated into the optical unit 1 of this embodiment, it is bent from the state shown in FIG. 6 with a valley fold line V1 as reference by approximately 180°. Note that, in the flexible printed circuit board 51 of this embodiment, a slit 55 is provided at a position corresponding to the valley fold line V1 so that the flexible printed circuit board 51 does not cause local bulging at this time and is easy to be bent. However, it may be configured without the slit 55. By performing bending by approximately 180° with the valley fold line V1 as reference, the region doubled by the region 51b and the region 51c corresponds to the side-surface facing region R1, and the region doubled by the region 51d and the region 51e corresponds to the side-surface facing area R2.

Next, perform the bending by approximately 90° with a valley fold line V2 as reference. As a result, the region doubled by the region 51b and the region 51c is arranged to face the first side surface 141 when the movable-body main body 14A is supported by the holder 14B. Next, the bending is performed by approximately 90° with the mountain fold line V3 as reference. And finally, the bending is performed by approximately 90° with the valley fold line V4 as reference (by performing bending by approximately 90° with the valley fold line V4 as reference, the 90° bending is performed with the mountain fold line V5 as reference). As a result, the region doubled by the region 51d and the region 51e is arranged to face the second side surface 142 when the movable-body main body 14A is supported by the holder 14B. Note that a bending order of the valley fold line V1, the valley fold line V2, the mountain fold line V3 and the valley fold line V4 does not have to be the order described above, but by bending in order of the valley fold line V1, the valley fold line V2, the mountain fold line V3, and the valley fold line V4, the flexible printed circuit board 51 is brought from the state shown in FIG. 6 to the state shown in FIGS. 2 to 5.

Here, in the optical unit 1 of this embodiment, the flexible printed circuit board 51 is bent by approximately 180° with the valley fold line V1 as reference, and the doubled region corresponds to the side-surface facing regions R1 and R2 and thus, lengths of the side-surface facing regions R1 and R2 to go in the optical axis direction are shortened. Then, the lengths of the side-surface facing regions R1 and R2 in the optical axis direction are shorter than the lengths of the fixed body 16 and the movable body 14 in the optical axis direction. With the configuration as above, the optical unit 1 of this embodiment can reduce the size in the optical axis direction.

Another Embodiment of Optical Unit

Next, referring to FIGS. 8 to 10, an embodiment of an optical unit 10 different from the optical unit 1 of the above embodiment shown in FIGS. 2 to 7 will be described. The optical unit 10 of this embodiment has the same configuration as that of the optical unit 1 except for the configuration of the flexible printed circuit board 51 and the holding configuration of the flexible printed circuit board 51, and has the same features as those of the optical unit 1 except for what will be described below.

Figure 8:
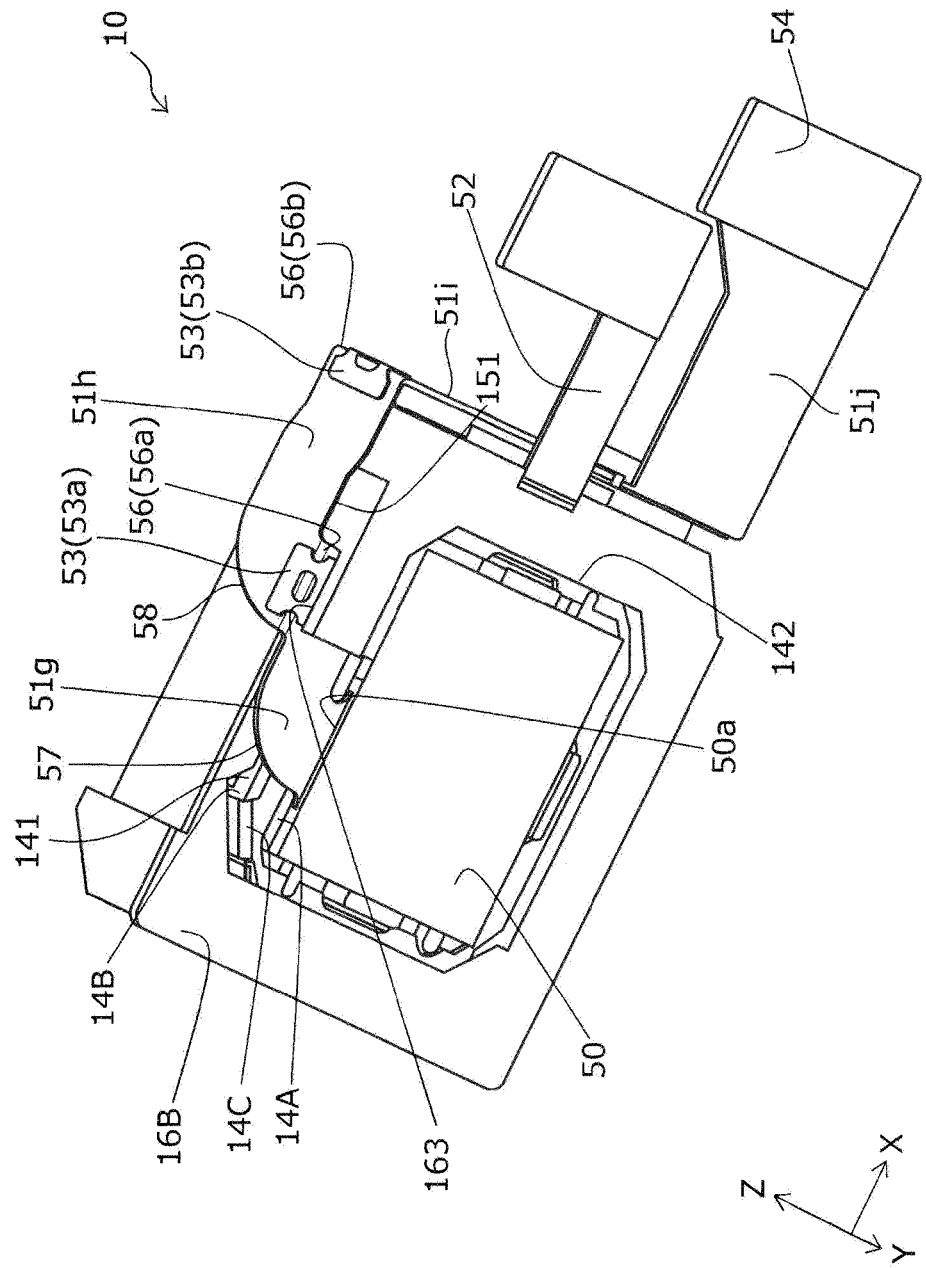
FIG. 8 is a perspective view of the optical unit according to another embodiment of the present invention, in which a part of a fixed body is omitted.
Figure 9:
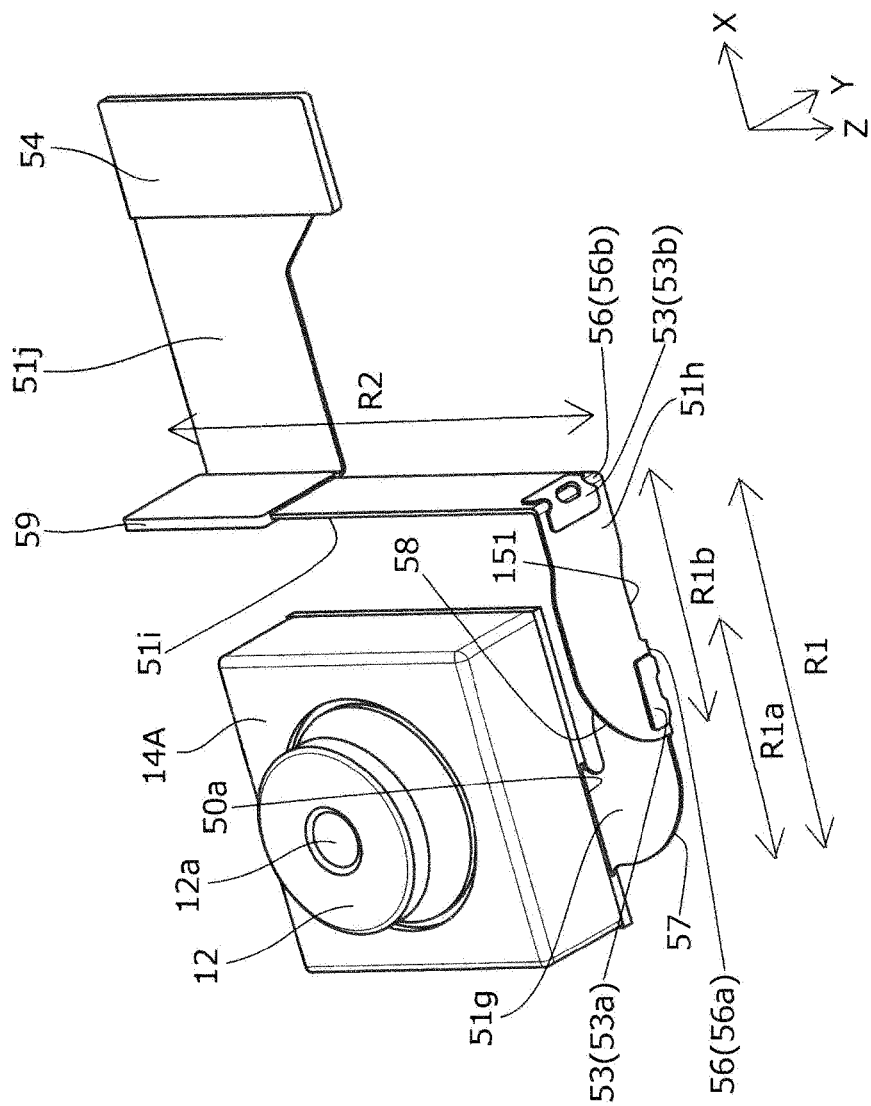
FIG. 9 is a perspective view illustrating a configuration of the flexible printed circuit board of the optical unit in FIG. 8.
Figure 10:
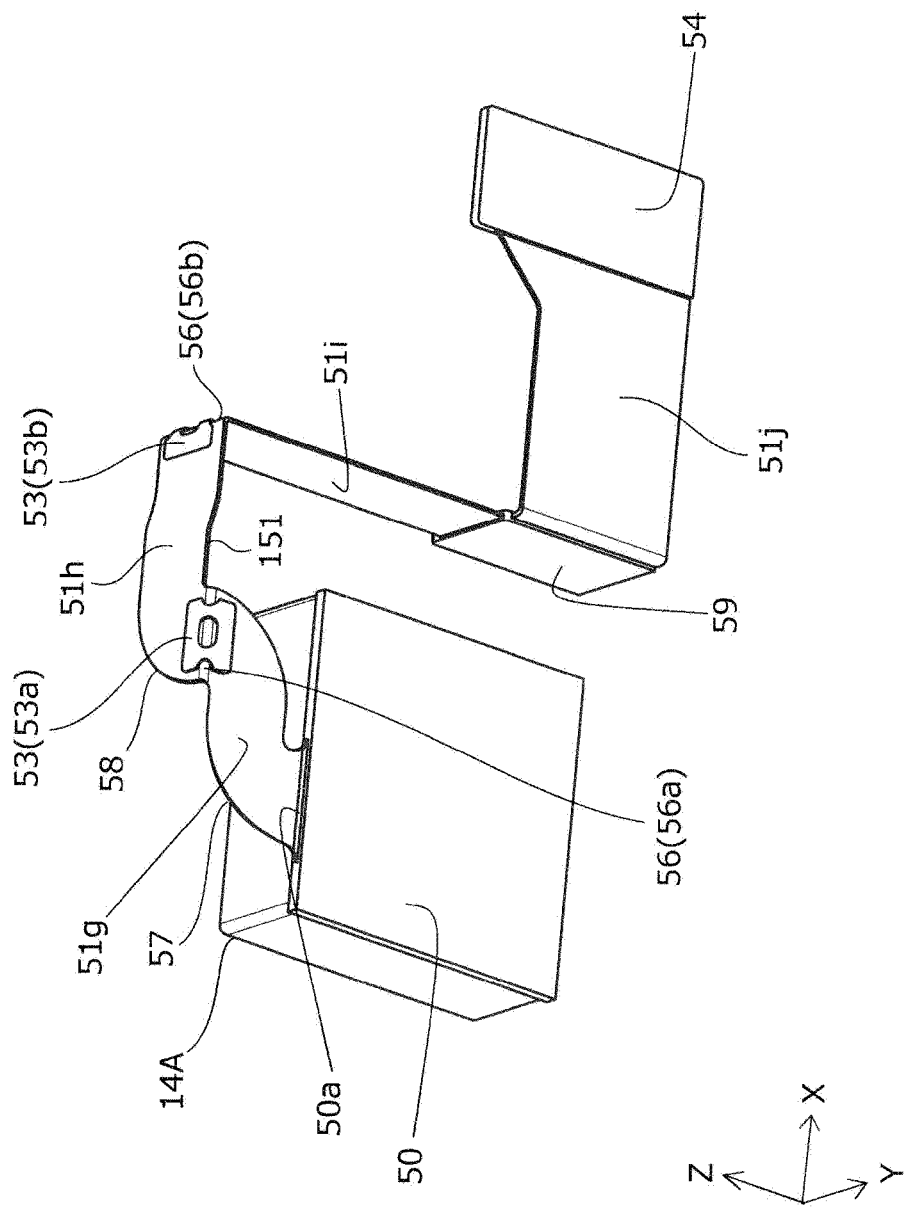
FIG. 10 is a perspective view illustrating the configuration of the flexible printed circuit board of the optical unit in FIG. 8, viewed from an angle different from that of FIG. 9.

In FIGS. 8 to 10, constituent members corresponding to the constituent members of the optical unit 1 shown in FIGS. 2 to 7 are given the same signs. Here, FIG. 8 shows a state in which the outer cover portion 16A is removed. In addition, FIGS. 9 and 10 show only the flexible printed circuit board 51 and the movable-body main body 14A so that the configuration of the flexible printed circuit board 51 can be easily understood.

As shown in FIGS. 8 to 10, in the optical unit 10 of this embodiment, the flexible printed circuit board 51 has a region 51g and a region 51h which form the side-surface facing region R1 and a region 51*i* which forms the side-surface facing region R2, and a region 51*j* in which the connection portion 54 with the outside is provided. The region 51*g* is connected to the connection portion 50*a* of a rigid FPC, which is a substrate on which the imaging element 50 is provided in a state where the flexible printed circuit boards 51 overlap in two layers. Here, the rigid FPC is a highly rigid substrate made of, for example, a four-layer flexible printed circuit board or the like. Note that, since the region 51*g* has the flexible printed circuit boards 51 overlapping in two layers, it is constituted to be narrower than the region 51*a* of the optical unit 1 shown in FIGS. 2 to 7, which is constituted by one layer of the flexible printed circuit board 51.

The region 51*h* is a region between the two bent portions 56, that is, between a bent portion 56*a* and a bent portion 56*b* in the flexible printed circuit board 51. The region 51*h* is also in a state where two layers of flexible printed circuit boards 51 are overlapped similarly to the region 51*g*. A bending holding portion 53*a* made of metal is attached to the bent portion 56*a*, and a bending holding portion 53*b* made of metal is attached to the bent portion 56*b*. Note that, as shown in FIG. 8, the frame body portion 16B has a notch portion 163 that sandwiches and supports a vicinity of the bent portion 56*a* of the flexible printed circuit board 51 provided.

The region 51*i* forms the facing region R2 together with a rigid FPC 59. The region 51*i* is also in the state where two layers of the flexible printed circuit boards 51 are overlapped similarly to the region 51*g* and the region 51*h*. Then, from the rigid FPC 59, the region 51*j* in which the connection portion 54 with the outside is provided extends in the +X direction. The region 51*j* is constituted by a single layer of the flexible printed circuit board 51. Note that, the connection portion 54 is a rigid FPC.

That is, in the optical unit 10 of this embodiment, the flexible printed circuit board 51 is configured such that, as the side-surface facing region R1 facing the first side surface 141, the region 51*h* is provided as an opposing surface opposing the first side surface 141 via the region 51*g* as an intersecting surface intersecting the first side surface 141 toward the second side surface 142 side along the first side surface 141 from the connection portion 50*a* with the movable body 14. Since the optical unit 10 of this embodiment has the region 51*g* as the intersecting surface of the configuration as above, it becomes easier to largely move the movable body 14 with respect to the fixed body 16 in the optical axis direction (Y-axis direction) by the region 51*g*. Since it becomes easier to largely move the movable body 14 with respect to the fixed body 16, power consumption when the movable body 14 is moved with respect to the fixed body 16 can be lowered. In addition, a width of the region 51*g* in the Y-axis direction can be constituted to be narrow, and interference of the region 51*g* with the other constituent members when the movable body 14 is moved with respect to the fixed body 16 can be suppressed.

In addition, as shown in FIG. 9, in the optical unit 10 of this embodiment, a length R1*a* of the region 51*g* in a direction (X-axis direction) toward the second side surface 142 side along the first side surface 141 is equal to a length R1*b* of the region 51*h* in the direction toward the second side surface 142 side along the first side surface 141. As described above, the length R1*a* of the region 51*g* in the direction toward the second side surface 142 side along the first side surface 141 is preferably configured to be 0.5 times or more and 2.0 times or less of the length R1*b* of the region 51*h* in the direction toward the second side surface 142 side along the first side surface 141. That is because, with this configuration, in both the optical axis direction (Y-axis direction) by the region 51*g* and the direction (Z-axis direction) intersecting the first side surface 141 by the region 51*h*, it becomes easier to largely move the movable body 14 with well balance with respect to the fixed body 16.

Moreover, as shown in FIGS. 8 to 10, in the optical unit 10 of this embodiment, the region 51*g* extends from the connection portion 50*a* with the movable body 14 in a direction (+Z direction) intersecting the first side surface 141 and then, via a first curved portion 57 toward the second side surface 142 side (+X direction) along the first side surface 141, and the first curved portion 57 has a round outer shape. Since the optical unit 10 of this embodiment has the configuration as above, as compared with the configuration in which the outer side of the first curved portion 57 has an angular shape, not a round one, when the movable body 14 is rotated with respect to the fixed body 16 with the X-axis direction as the rotation axis, a movement amount of the outer side of the first curved portion 57 can be reduced. In other words, interference of the flexible printed circuit board 51 with the other constituent members can be suppressed.

Moreover, as shown in FIGS. 8 to 10, in the optical unit 10 of this embodiment, the region 51*h* extends from the region 51*g* side in a direction (−Y direction) intersecting the region 51*g* and then, via the second curved portion 58 toward the second side surface 142 side along the first side surface 141, and the second curved portion 58 has a round outer shape. Since the optical unit 10 of this embodiment has the configuration as above, as compared with the configuration in which the outer side of the second curved portion 58 has an angular shape, not a round one, when the movable body 14 is rotated with respect to the fixed body 16 with the Y-axis direction as the rotation axis, the movement amount of the outer side portion of the second curved portion 58 can be reduced. In other words, interference of the flexible printed circuit board 51 with the other constituent members can be suppressed.

In addition, as shown in FIGS. 8 to 10, in the optical unit 10 of this embodiment, the connection portion 50*a* with the movable body 14 is provided slightly closer to the +X direction side than an end portion on the −X direction side of the movable-body main body 14A. Expressed differently, the connection portion 50*a* with the movable body 14 is configured at a position on the side separated away from the second side surface 142 in the first side surface 141 and not including the most separated position from the second side surface 142. With the configuration as above, wiring can be made simple and compact.

Moreover, as shown in FIGS. 8 to 10, in the optical unit 10 of this embodiment, the region 51*h* as the opposing surface is configured to have a curved portion 151 and to bulge once toward the −Y direction side and then, to bulge to the +Y direction side in the +X direction (the direction from the region 51*g* side, which is the intersecting surface, toward the region 51*i* side, which is the second side surface) when viewed from the +Z direction, which is the side opposing the region 51*h*. That is, the region 51*h* is configured to meander in the direction from region 51*g* side toward the region 51*i* side when viewed from the +Z direction due to the curved portion 151. With the configuration as above, it is possible to suppress the bent portion 56*a* from becoming longer in the X-axis direction due to variation of the bending position or the like when the flexible printed circuit board 51 is bent in order to form the bent portion 56*a*.

The present invention is not limited to the above-described embodiments, but can be realized with various configurations within a range not departing from the spirit of the present invention. For example, technical features in the embodiments corresponding to the technical features in each of the aspects described in SUMMARY can be appropriately replaced or combined to solve some or all of the problems described above, or to achieve some or all of the effects described above. Moreover, unless the technical features are described as indispensable in this specification, it may be omitted as appropriate.

What is claimed is:

1. An optical unit comprising:
a movable body which comprises an optical module and to which a flexible printed circuit board is connected;
a fixed body;
a rotation support mechanism to support the movable body rotatably with respect to the fixed body using an optical axis direction of the optical module as a rotation axis;
a gimbal mechanism to support the movable body rotatably with respect to the fixed body using at least two directions intersecting the optical axis direction as rotation axes, wherein
the movable body has a first side surface, a second side surface, a third side surface, and a fourth side surface as movable-body side surfaces each of which faces the direction intersecting the optical axis direction,
the first side surface positioning on an opposite side to the third side surface, and the second side surface positioning on an opposite side to the fourth side surface,
the flexible printed circuit board is connected to the movable body on the first side surface side, has a clearance provided with respect to the movable-body side surface, and has a side-surface facing region facing the movable-body side surface, the side-surface facing region is arranged to face the first side surface and the second side surface but not to face the third side surface or the fourth side surface, and
in the flexible printed circuit board, as the side-surface facing region facing the first side surface, an opposing surface opposing the first side surface is provided from a connection portion in connection with the movable body via an intersecting surface intersecting the first side surface toward the second side surface side along the first side surface, wherein a planar portion of the opposing surface and a planar portion of the intersecting surface are orthogonal to each other, and the planar portion of the intersecting surface extends from the connection portion in a direction orthogonal to the first side surface; and
a first bending holding portion which is a sheet metal attached to a bent portion formed between the opposing surface and the intersecting surface of the flexible printed circuit board.

2. The optical unit according to claim 1, wherein
the side-surface facing region is arranged so as to extend from a side separated away from the second side surface in the first side surface to a side separated away from the first side surface in the second side surface.

3. The optical unit according to claim 1, wherein
the flexible printed circuit board is connected to the first side surface without being fixed in planar contact, and a clearance is provided between the first side surface and the entire side-surface facing region facing the first side surface.

4. The optical unit according to claim 1, wherein
the flexible printed circuit board is fixed to a fixed-body side fixing portion provided on the fixed body; and
the fixed-body side fixing portion is arranged only in a part of a position opposing the second side surface in the direction intersecting the optical axis direction and fixes only a part of the side-surface facing region in the optical axis direction.

5. The optical unit according to claim 4, wherein
a notch is provided in the fixed-body side fixing portion; and
the side-surface facing region is fixed in the notch.

6. The optical unit according to claim 1, wherein
the fixed body has a fixed-body side surface that surrounds the movable body in the direction intersecting the optical axis direction; and
the side-surface facing region is arranged in a clearance between the movable-body side surface and the fixed-body side surface.

7. The optical unit according to claim 1, wherein
the movable body has a holder to hold the optical module and a holder support portion to support the holder; and
the rotation support mechanism has a holder fixing portion fixed to the holder, a holder support-portion fixing portion fixed to the holder support portion, and an elastic portion to connect the holder fixing portion and the holder support-portion fixing portion.

8. The optical unit according to claim 7, wherein
the gimbal mechanism has a fixed-body side leg portion connected to the fixed body, a movable-body side leg portion connected to the movable body, and a gimbal frame portion in which the fixed-body side leg portion and the movable-body side leg portion are provided; and
when viewed from the optical axis direction, a position of the elastic portion is displaced with respect to positions of the fixed-body side leg portion and the movable-body side leg portion.

9. The optical unit according to claim 1, further comprising:
a second bending holding portion made of metal and configured to hold the side-surface facing region of the flexible printed circuit board in a bent state so that the side-surface facing region faces the first side surface and the second side surface.

10. The optical unit according to claim 1, wherein
the flexible printed circuit board is bent in a curved-surface state so that the side-surface facing region faces the first side surface and the second side surface.

11. The optical unit according to claim 1, wherein
a length of the intersecting surface in a direction along the first side surface toward the second side surface side is 0.5 times or more and 2.0 times or less of a length of the opposing surface in the direction along the first side surface toward the second side surface side.

12. The optical unit according to claim 1, wherein
the intersecting surface extends from the connection portion via a first curved portion, toward the second side surface side along the first side surface; and
the first curved portion has a round outer shape.

13. The optical unit according to claim 1, wherein
the opposing surface extends from the intersecting surface side into a direction intersecting the intersecting surface and then, via a second curved portion, toward the second side surface side along the first side surface; and
the second curved portion has a round outer shape.

14. The optical unit according to claim 1, wherein
the connection portion in connection with the movable body is at a position on the first side surface, which is separated away from the second side surface, and does not include a most separated position from the second side surface.

15. The optical unit according to claim 1, wherein
the opposing surface has a curved portion protruding in a direction separated away from the intersecting surface when viewed from a side facing the opposing surface and goes from the intersecting surface side toward the second side surface side.

* * * * *